United States Patent [19]

Czvikovszky et al.

[11] Patent Number: 4,706,711

[45] Date of Patent: Nov. 17, 1987

[54] ELASTIC TECHNICAL HOSE WITH A FOAM INSERT

[75] Inventors: Tibor Czvikovszky; Gábor Kovács; Endre Lakner; Lajos Mahr; Ágnes Somogyi, all of Budapest; Sándor Mikes, Szeged; György Kégly, Budapest; István Muzsai, Budapest; László Palotás, Budapest; Nándor Pfisztner, Budapest, all of Hungary

[73] Assignee: Taurus Gumiipari Vallalat, Budapest, Hungary

[21] Appl. No.: 775,080

[22] Filed: Sep. 12, 1985

[30] Foreign Application Priority Data

Sep. 12, 1984 [HU] Hungary .............................. 3438/84

[51] Int. Cl.$^4$ .............................................. F16L 55/00
[52] U.S. Cl. .................................... 138/103; 138/137; 138/149; 138/178; 138/DIG. 5; 138/DIG. 9; 405/171
[58] Field of Search ............... 138/103, 149, 129, 154, 138/178, DIG. 5, DIG. 9, 137; 428/36, 154; 405/171, 173

[56] References Cited

U.S. PATENT DOCUMENTS

| | | | |
|---|---|---|---|
| 4,153,079 | 5/1979 | Ambrose | 138/103 |
| 4,259,553 | 3/1981 | Tanaka et al. | 138/103 |
| 4,417,603 | 11/1983 | Argy | 138/149 |
| 4,590,108 | 5/1986 | Nippe | 138/149 |

Primary Examiner—James E. Bryant, III
Attorney, Agent, or Firm—Karl F. Ross; Herbert Dubno

[57] ABSTRACT

A technical hose with foam insert, expediently a maritime swimming hose for drawing-off oil, as well as to the process for the production thereof. The hose according to the invention consists of the elastic cross-linked elastomer layer containing also fibre-reinforcement, of the foam layer with closed cells arranged above said layer and assuring swimming ability, as well as of the new type of outer coating sheet.

The outer coating sheet is a multi-layer system, the elementary layers are previously partially cross-linked, in their cross-section inhomogenous elastomer layers, stretched longitudinally in a given case, being interconnected and connected to the foam layer, respectively, by means of thermally and/or chemically activated adhesive layers.

3 Claims, 1 Drawing Figure

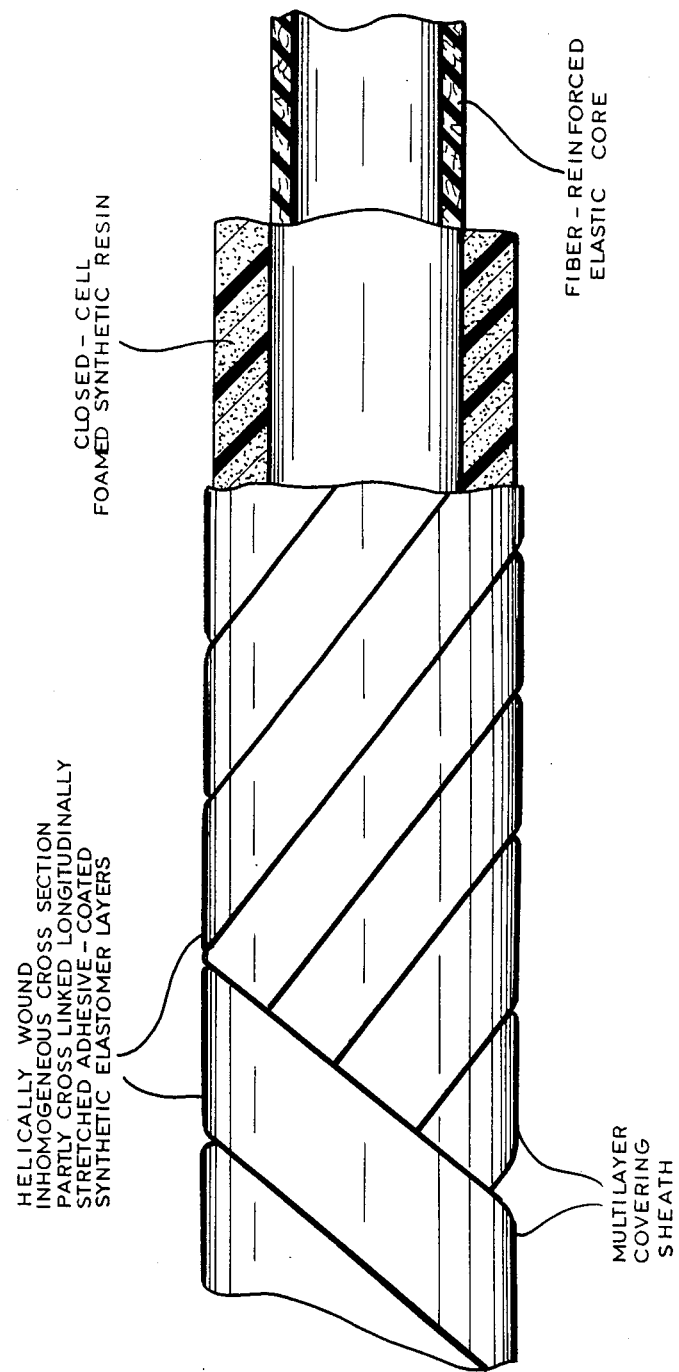

ELASTIC TECHNICAL HOSE WITH A FOAM INSERT

FIELD OF THE INVENTION

The invention relates to elastic hoses with a foam insert for technical purposes, in particular for use as typical maritime floating hoses for drawing oil off water, as well as to the process for producing the hose by using a new type of elastomer outer coating layer.

BACKGROUND OF THE INVENTION

Maritime floating hoses for drawing-off oil consist of a manifold complex and reinforced inner layer, of a foam which imports the enclosing and a floating ability, the synthetic foam being provided with a coating sheet closing the whole system from outside. Hose production could usually be divided into two main parts: after having built up completely the inner reinforced hose system, prior to applying the foam layer the system is subjected to heat treatment and fully vulcanized; thereafter, during a second main phase the foam layer is applied and thus the outer coating sheet is formed, which is then separately vulcanized.

This separation of processes is imperative, as the most important physico-mechanicl characteristics of the foam layer to be used and the desired large specific volume are all temperature-dependent. Specific volume of the floating layer, when it is formed of thermoplastic synthetic foam, is reduced considerably and in an irreversible manner even if heat-treatment is performed under an insignificant pressure; however, this kind of curing is indispensable for vulcanizing a 3-5 mm thick rubber coating a floating foam layer may be formed by using a special shaping technology, e.g. local "in situ" foaming of a on polyurethane. However, this method is seldom more economical than building up the hose from a roll, well adaptable to a plurality of hose sizes, whereby the foam layer is formed by winding the elastic foam-sheet with closed cells. Accordingly, the pivotal question of production of floating hoses for drawing-off oil is to what extent thermal load—i.e. temperature of thermal curing and/or duration of heat treatment—needed for the formation of the outer coating above the foam layer can be reduced.

According to the British Patent Specification GB-PS No. 1 202 094 the problem of avoiding considerable compression of the thermoplastic foam layer in course of the second heat treatment is solved in the course of hose building by applying above the foam layer a further special stiff (helical) reinforcing layer to prevent compression of the foam layer. This reinforcing element may be a high-strength spiral made of a fiber-reinforced reactive synthetic material (e.g. of a glassfiber-twist with an epoxy resin as binding material). However, when evaluating this technically doubtless good but most expensive solution, it should be considered that said reinforcing means scarcely contributes to the vacuum or pressure tolerance of the oil transporting hose, i.e. to the most important operative parameters. As these parameters are to be achieved in functional/inner/hose itself. In the British Patent Specification it is proposed to build-up the reinforcing means in the inner hose layer by using a steel-wire system.

According to the British Patent GB-PS No. 1 239 397 in the inner functional system of the swimming hose a glassfiber-reinforced synthetic spiral is inserted.

Protection of the semi-stiff synthetic foam against compression is solved by placing the synthetic foam into the interspaces between the rubber layers which have been wound helically from an extruded rubber sheet with a rectangular cross-section, while maintaining keeping a considerable distance between the adjacent turns. Applied also from a sheet-roll, in a helical form. It is quite obvious that this solution is satisfactory except for the introduction of foam in a restricted layer thickness. One of the most important features of the maritime hoses for drawing off oil,—ability to float—is also considerably restricted.

OBJECT OF THE INVENTION

The aim of the invention is to provide a hose and a process for making same, in course of which the foam layer of the hose and the surrounding outer coating sheet connected thereto can be formed more economically by comparison with when compared to known solutions, in course of the process less expensive external reinforcing elements can be used and the formation of a foam layer in unrestricted thickness can be enabled, simultaneously keeping the principle of assembly by winding, which can be flexibly adapted to a range of hose sizes.

SUMMARY OF THE INVENTION

In addition to meeting the requirements relating to floating hoses (mechanical strength, elasticity, flexibility, resistance to weather etc.) our aim was to form the character of the cross-linked (volcanized) elastomer of the outer layer in such a manner that this technological step should involve the possible least thermal load. In other words, the outer layer application should take place in course of a heat treatment of the possibly shortest duration and/or at the possibly lowest temperature. This is to protect ed by the protection of the foam layer which is sensitive to irreversible deformation by heating.

In course of our activity we suprisingly found that formation of the outer coating sheet does not require the production of a fully vulcanized outer elastomer sheet made according to traditional methods, but it can be prepared in a most simple manner, by winding, and so, that the coating sheet is built up of synthetic elastomer layers, cross-linked previously in cross-section to different extents and stretched in longitudinal direction, and said layers are interconnected by a high-strength chemically and/or thermally activated adhesive layer free from solvent.

Summing up what has been said, the invention provides a hose with an elastic foam insert, e.g. a typical maritime coating hose for drawing-off oil, consisting of an inner elastic layer containing a fiber-reinforcement, the synthetic foam layer with closed cells assuring a floating ability even in a filled state of the hose and an outer coating sheet. According to the invention the outer coating sheet of the hose is a multi-layer system, the components of which are synthetic elastomer layers which are inhomogeneous in cross-section and previously cross-linked in part and stretched longitudinally and whih are interconnected by adhesive layers activated thermally and/or chemically.

With a preferred embodiment of the hose according to the invention the elastomer layer having been previously partially cross-linked and forming the components of the outer coating sheet is inhomogeneous in cross-section to such an extent that the degree of cross-linking of the upper sides is between 45 and 100%, while the degree of cross-linking of the lower side is between 0 and 55%.

The invention also provides a process for producing the aforementioned hose, in course of which onto the inner layer containing the fiber-reinforcement—after the complete vulcanization thereof—a synthetic foam layer with closed cells is applied, thereafter onto said foam layer a helically wound outer coating sheet is placed. The process can be characterized in that the outer coating sheet is formed of synthetic elastomer layers which are inhomogeneous in cross-section, previously partially cross-linked and stretched in longitudinal direction, while said layers are connected to one another and the innermost layer to the foam layer by a thermally and/or chemically activated adhesive layer.

In accordance with the invention as a basic material for the elastomer layers of the outer coating sheet polyolefins, olefine copolymers, vinyl polymers or a mixture thereof are used.

Preferably according to the invention, previous partial cross-linking of the elastomer layers forming the components of the outer coating sheet is performed by electron-treatment, i.e. by irradiating with accelerated electrons or with the aid of chemical initiators. In case of cross-linking performed by electron-treatment it seems to be expedient to perform irradiation with electrons with are predetermined (restricted) energy to achieve partial cross-linking inhomogeneously over the cross-section of the elastomer layers forming the components of the outer coating sheet and to regulate the depth of electron penetration.

With another mode of realization of the process according to the invention cross-linking of the elastomer layer forming the components of the outer coating sheet can be performed with chemical initiators too, by using chemical initiators affecting in course of plastic shaping of said layer (foil-blowing, extrusion), e.g. organic peroxy compounds decomposing under the effect of heat.

In course of the process according to the invention for preparing the previously cross-linked elastomer foil to be used as a constituent element of the outer coating sheet co-extrusion, coating, laminating or any other similar process can be applied, and in such a manner the foil which is inhomogeneous in its cross-section containing also the thermally and/or chemically activated adhesive layer and the cross-linked layer can be suitably formed.

With a further advantageous performance of the process according to the invention the previously partially cross-linked elastomer foil to be used as a constituent of the coating sheet of the technical hose with the foam insert is stretched by reducing the transverse size of the foil by 10% at most and in the longitudinal direction by 0 to 50% at a temperature approximating the crystalline melting point of the original polymer. Thereafter the foil thus stretched is cooled and used in the cooled state for forming the outer coating sheet in the final stage of hose-building, by winding it up helically, followed by reduced heat treatment, locally or extending over the entire hose.

Due to the character of the previously partially cross-linked foil and thermo-mechanical pre-treatment, the coating of the hose which is formed from the said foil, i.e. the elastic sheet in several layers, not only can excellent mechanic properties be achieved but a shrinking force is generated which yields an excellent adhesive force between the layers forming the coating sheet and the foam layer as well through the adhesive layer in course of the heat treatment with a far lower thermal load, when compared to eariler processes.

The most important technical advantages of the process according to the invention are, as follows:

a. Formation of the coating sheet on the technical hose with the foam insert can be performed with a far lower thermal load (shorter duration of heat treatment and/or at a lower temperature), than in course of earlier processes, with vulcanizing coating sheets of similar size made of mixtures on synthetic or natural rubber basis. This ensures protection against compression and thus significant savings in respect of the foam material.

b. More careful heat-treating phase of the process results in a considerable saving in heating energy.

c. Simplification of the second curing stage of the production technology of technical hoses with foam insert results in the considerable shortening of cycle-time, increasing transmitting capacity and productivity of the production line.

d. In building the new type of coating sheet, there is no need to use an adhesive layer containing a solvent either between the constituents forming the coating or the coating and the foam layer. In the application of the solvent-free adhesive fire-and accident hazard—accompanying the use of solvents—can be avoided.

Performance of the process according to the invention becomes obvious from the following examples:

EXAMPLE 1

From an ethylene-vinyl-acetate copolymer elastomer containing 8 to 10% vinyl acetate (flow index=0.80 g/10 minutes at 190 C.° and at a load of 2.16 kp) on a wide-gap extruder a 0.80 mm thick and 100 mm wide foil-band is extruded, The band is cross-linked on an industrial electron accelerator (e.g. a Van de Graaff generator with an accelerating voltage of 1.5 MeV), expediently allowed to pass several times under the bundle of rays, with totally 7.5 Mrad radiation dosis.

While leading the cross-linked polyolefins elastomer band through a water bath of 95 C.°, it becomes deformed so, that it should stretch in longitudinal direction by about 40%, while the stretch in the transverse dimension should be less by 10% at the most. The cross-linked foil in a thickness of about 0.55 mm is cooled in this stretched state, thereafter it is coated with a solvent-free thermally activated adhesive layer, the main constituent of which is a ethylene-vinylacetate copolymer with 35% VAC content and melting at 70 C.°, containing in addition a quantity of 1.5% resin of natural origin (e.g. pine resin) with an unsaturated group of the ethylene type. The final thickness of the adhesive layer amounts to 0.16 mm.

Thereafter, onto the technical hose having a traditional inner core and built-up in a traditional way and coated with a 20 mm thick polyethylene foam layer with closed cells, from the aforementioned elastomer foil five layers are applied one above the other by helical winding on the usual hose-building machine provided with a servicer.

The raw hose thus prepared is coated by winding a bandage of polyamide cloth thereon in the usual way, thereafter the hose is cured in the vulcanizing boiler at 110° for 20 minutes. In contrast to the hose covered with the traditional rubber sheet, volume reduction of the soft polyolefine foam insert in the technical hose with the foam insert produced according to the process of the invention is not more, than 10%.

EXAMPLE 2

From a tertiary copolymer consisting of ethylene, acrylic acid and acrylic ester (e.g. lupolen A 2910 MX) with a flow index of 6–8 g/10 minutes at 190 C.° and a load of 2.16 kp, on a wide-gap extruder 0.60 mm thick and 80 mm wide foil-band is extruded. The band is treated by allowing to pass once under an industrial electron accelerator, e.g. under the bundle of rays of an electron-treating apparatus of the ELECTROCURTAIN type with an accelerating voltage of 200 keV, subjected totally to a radiation dosis of 5.0 Mrad. As a result of radiation on the side of the foil facing the bundle of rays, so about in the half-thickness of the foil, grade of cross-linking will be more, than 50%, while on the other side it lies in the range between 0 and 50%.

We proceed according to example 1 and form the coating layer on the technical hose with the foam insert using the material produced, with the difference that six layers are applied on one another by winding helically the foil. With the heat treatment according to the Example 1 a hose coating with excellent mechanical features will be obtained.

EXAMPLE 3

From 70 mass-parts of polyethylene of low density with a flow index of 0.3 g/10 minutes (at 190 C.° and a load of 2.16 kp) and 30 mass-parts of ethylene-vinyl-acetate copolymer with a vinyl acetate content of 18% and with a flow index of 2.0 g/10 minutes (at 190 C.° and 2.16 kp load) a polymer-mixture (blend) is to be prepared, from which a foil band in the size according to Example 2 is prepared by extrusion. The partially cross-linked polyolefine band is stretched by about 40% according to example 1, thereafter the stretched band is allowed to cool. We proceed according to example 1 and from the material described therein an adhesive layer in the thickness of 0.15 mm is applied onto the stretched foil. The elastomer system thus received is used as a hose coating according to example 2. It is characteristic for the hose coating that ripping strength is better, than 50 N/cm.

EXAMPLE 4

From an ethylene-vinyl-acetate copolymer containing 18% vinyl-acetate and with a flow index of 2.0 g/10 minutes (at 190 C.° and with a load of 2.16 kp) on a hose-blowing foil extruder a foil hose with a wall thickness of 0.60 mm is extruded; from the hose a 100 mm wide band is cut out. The band is subjected to radiation according to Example 2, on the equipment described. The partially cross-linked band of polyolefine elastomer is allowed to pass through a water bath of 90 C.° and meanwhile it is deformed so that it should stretch longitudinally by 50% but the stretch in transverse direction should be less by 10% the most.

The partially cross-linked and stretched elastomer band is applied onto the technical hose having been coated with polyethylene foam layer with closed cells as described in Example 1, then by using a traditional pressbandage made of polyamide cloth it is subjected to heat treatment at 125 C.° for 30 minutes. The system thus achieved results in a high-strenght elastic coating with good technical characteristics.

EXAMPLE 5

The extruded band made of the basic material according to Example 1 is subjected to radiation according to Example 2, thereafter the adhesive layer according to Example 1 is applied onto the partially crosslinked—but unstretched foil. Above the foam layer hose coating is to be built up in all respects in accordance with Example 1, however, with the difference, that on the winding machine ("servicer") the stretching force is set to a value which surpasses by 50% the usual force. Heat treatment of the hose is not performed in the vulcanizer but with a single-purpose machine forming a part of the servicer heating the hose locally to about 150 C.° A hose coating of excellent quality can be obtained with a simultaneous considerable saving in technological energy.

EXAMPLE 6

As described in Example 1, from an ethylene-vinylacetate copolymer and admixed 1.5% dicumyl-peroxyde initiator a cross-linked 0.80 mm thick and 100 mm wide foil band is prepared. The cross-linked band is to be stretched and provided with the adhesive layer according to Example 1. Further application is also in compliance with Example 1.

Below the coating sheet thus obtained compression of the foam layer is less, than 10 vol.%.

What we claim is:

1. In an elastic technical hose with a foam insert, expediently a maritime floating hose for drawing-off oil, consisting of an inner elastic layer, said layer containing fiber reinforcement, a synthetic foam layer with closed cells assuring floating ability even in a filled state of the hose and an outer coating sheet, the improvement wherein the outer coating sheet of the hose is a multilayer system, the components of which are synthetic elastomer layers inhomogeneous in cross-section and previously partly cross-linked and stretched longitudinally, which are interconnected by adhesive layers.

2. The improvement defined in claim 1 wherein the elastomer layer having been previously partially cross-linked and forming the components of the outer coating sheet is inhomogenous in cross-section to such an extent that cross-linking of the upper sides lies in the range between 45 and 100%, while cross-linking of the lower sides up to 55%.

3. A floating hose for drawing oil off water, comprising:
an inner fiber-reinforced vulcanized elastomeric layer;
a thermally sensitive foam layer enveloping said inner fiber-reinforced vulcanized elastomeric layer; and
an outer sheath surrounding said thermally sensitive foam layer and comprising a plurality of superposed stretched helical olefin-based polymeric layers each having a degree of cross-linking varying over the thickness thereof and ranging from a degree of cross-linking between 45 and 100% along an outer surface of the respective layer and up to 55% along an inner surface of the respective layer, said polymeric layers of said outer sheath each being longitudinally stretched to a greater extent than their transverse stretch and being bonded together and to said thermally sensitive foam layer by a solvent-free adhesive.

* * * * *